O. M. STOUT.
CHOCOLATE DEVELOPING MACHINERY.
APPLICATION FILED MAY 22, 1919.

1,349,235.

Patented Aug. 10, 1920.
3 SHEETS—SHEET 1.

INVENTOR
Oscar M. Stout
BY
Ivan E. O. Konigsberg
ATTORNEY

O. M. STOUT.
CHOCOLATE DEVELOPING MACHINERY.
APPLICATION FILED MAY 22, 1919.
1,349,235.
Patented Aug. 10, 1920.
3 SHEETS—SHEET 2.
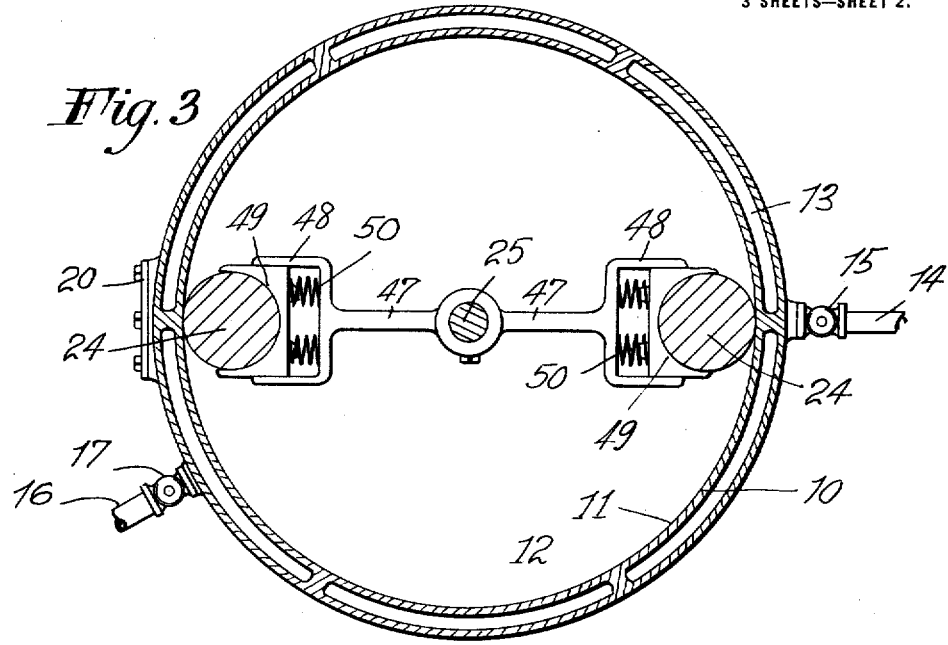
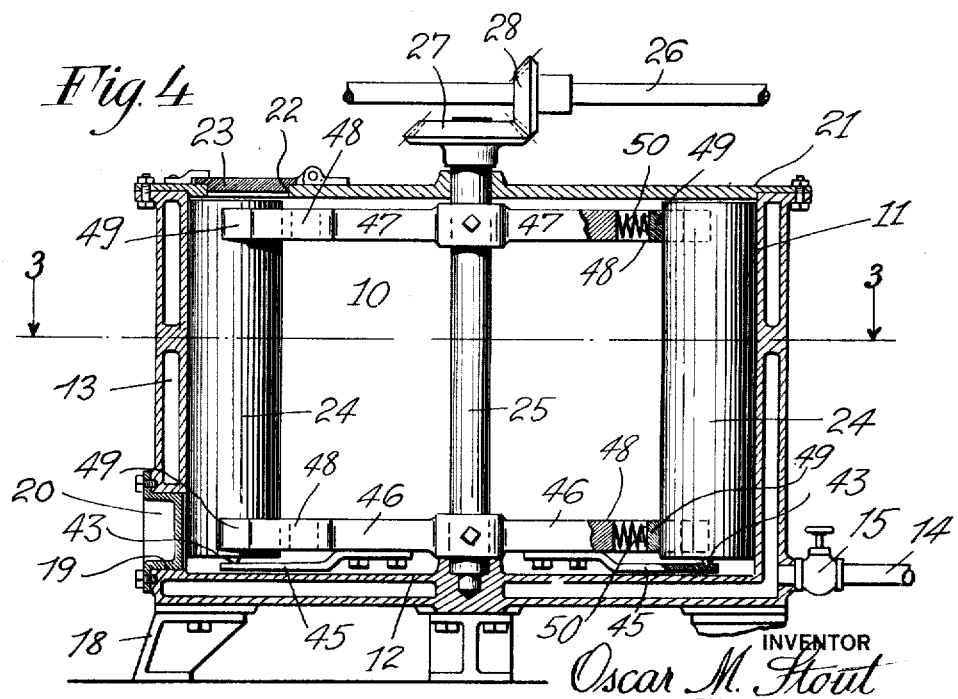
INVENTOR
Oscar M. Stout
BY
Ivan E. O. Konigsberg
ATTORNEY

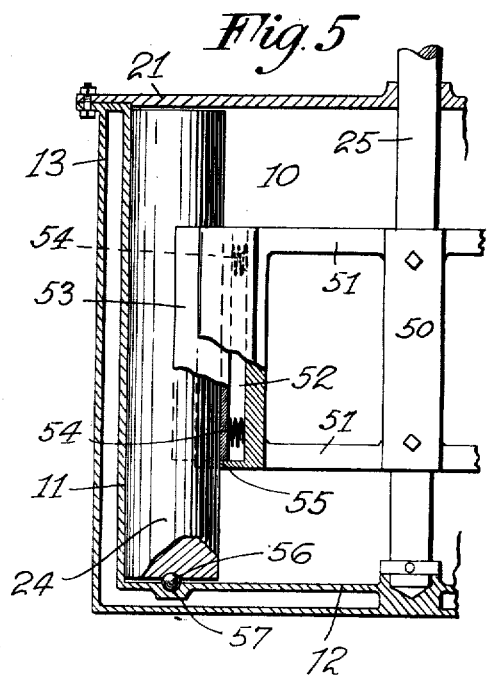

UNITED STATES PATENT OFFICE.

OSCAR M. STOUT, OF BROOKLYN, NEW YORK.

CHOCOLATE-DEVELOPING MACHINERY.

1,349,235.          Specification of Letters Patent.       Patented Aug. 10, 1920.

Application filed May 22, 1919. Serial No. 298,925.

*To all whom it may concern:*

Be it known that I, OSCAR M. STOUT, a citizen of the United States, and resident of Brooklyn, in the county of Kings and State of New York, have invented certain new and useful Improvements in Chocolate-Developing Machinery, of which the following is a specification.

This invention relates to chocolate making machinery and has particular reference to a machine for developing the chocolate mixture after the ingredients have been ground, mixed and treated in the so called finishing machines. From the latter the product comes in either a paste or powder form, after which it is put into the developing machine and cocoa butter may be added. The next step in the manufacture is the developing of the material, which consists in so blending, mixing and stirring the ingredients that they become fully developed in their characteristics so as to combine intimately to form a smooth, thoroughly worked finished product.

In order to obtain a smooth perfectly finished chocolate, it is necessary that the materials be thoroughly ground and worked into each other so as to develop the full flavor as well as producing a mechanically perfect product.

It is the object of this invention to provide a machine for developing chocolate, as it is understood in the art, of novel, simple and efficient design and construction adapted to be manufactured at relatively low cost, occupying comparatively small space while having a relatively high coefficient of quantity production as well as being peculiarly adapted in a mechanical sense to produce a perfect chocolate in which the ingredients are so intimately mixed, blended, worked into one another and developed, that subsequent separation, settling or like action becomes negligible for all practical purposes.

With the above and other objects in view, my invention is embodied in a chocolate developing machine as hereinafter described and as illustrated in the accompanying drawings in which—

Fig. 3 is a view similar to Fig. 1 and taken on a line 3—3 of Fig. 4, showing a modification;

Fig. 4 is a vertical substantially central sectional view of Fig. 3;

Fig. 5 is a fragmentary sectional view of a machine similar to those shown in the preceding figures, but illustrating a modification.

Figure 1:
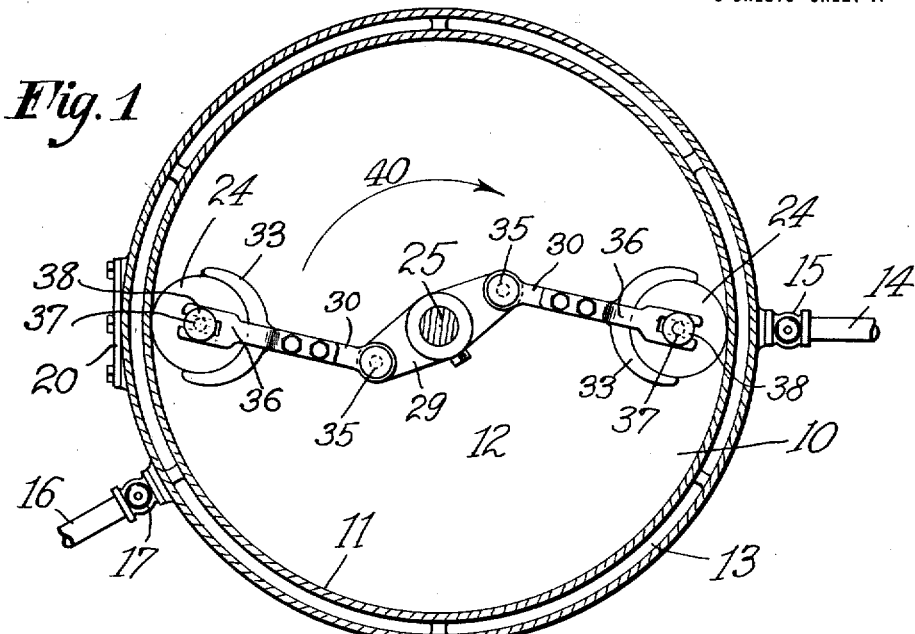
Figure 1 is a sectional plan view of a machine embodying my invention.
Figure 2:
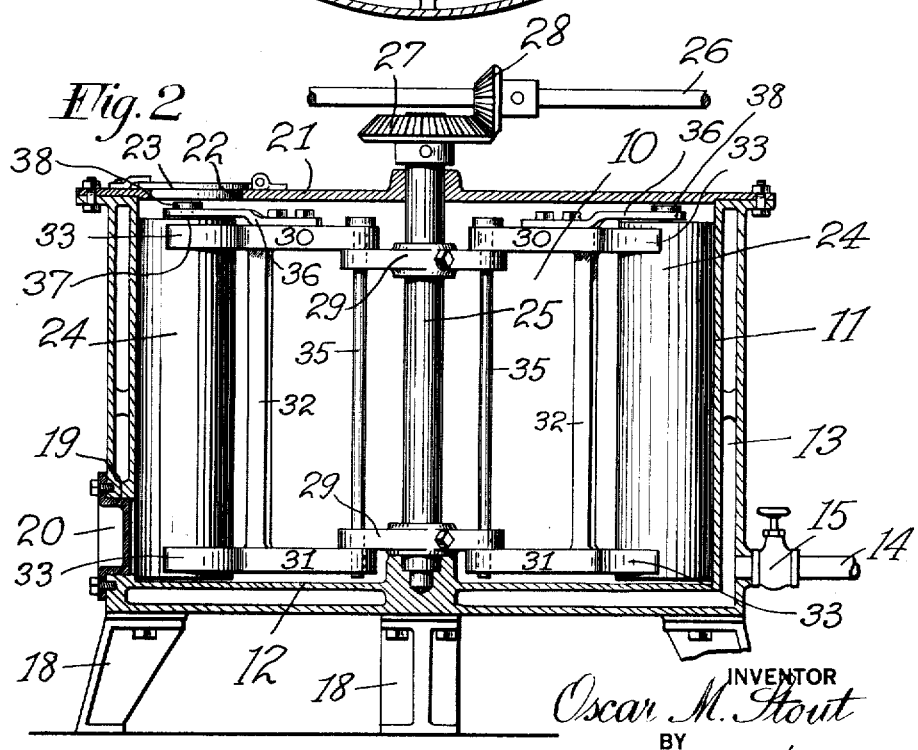
Fig. 2 is a substantially central vertical sectional view of the machine shown in Fig. 1.

Referring to Figs. 1 and 2 the machine comprises a cylindrical container 10 preferably made of metal and bored to a true cylinder having vertical walls 11 and a flat bottom 12.

The container is provided with a steam jacket 13. The steam supply pipe 14 is controlled by a valve 15 and the steam outlet 16 is controlled by a valve 17. Other means for heating the contents of the container may be employed. 18, 18 indicate suitable supporting means. 19 is an outlet closed by a suitable cover 20. The container is closed by a cover 21 having an inlet 22 closed by a cover 23.

The developing means within said container consists of two hard surfaced cylinders or rollers 24, 24 supported and operated in a vertical position to grind, mix and work the material by contact with the wall 11 of the container. To this end there is supported centrally of the container an operating shaft 25 which is driven from the main driving shaft 26 by means of gears 27 and 28. Several containers may be operated from one driving shaft as will be understood. The rollers 24 may be of metal, stone or other hard material.

To the shaft 25 there are secured two operating arms 29, 29 and on the latter and angularly disposed with relation thereto are pivoted driving arms 30 and 31 preferably rigidly joined by a web or similar member 32. The ends 33 of the driving arms are bifurcated as shown and fit around the body of the developing rollers 24. 35 is a pivot bolt or rod which connects the operating arms 29 to the driving arms 31 and 30. On the latter is secured a supporting bifurcated bracket 36 from which the developing roller is suspended by a bolt 37 and washer 38. The direction of rotation of the shaft 25 is indicated by the arrow 40.

The operation is as follows: The container is filled with the chocolate ingredients to within a short distance of the top. When the power is applied, the shaft 25 will commence to rotate in the direction indicated. The result will be that the toggle formed by the arms 24 and 30—31 will tend to straighten due to the greater resistance of the material against the relatively large surfaces presented by the developing rollers and the webs 32. As a consequence the developing roller will be forced outward against the wall of the container while being driven in the direction of the arrow 40, the bifurcated ends of the brackets 36 permitting such radially outward movement of the rollers while supporting them.

The result obtained from the operation is that of the rollers 24 being rotated through the mixture while they themselves are being rotated in the opposite direction by friction with the wall of the container.

Consequently a steady grinding, smoothing, mixing and developing of the materials is being produced by the action of the hard rollers against the metal wall of the container. It will be noted that the pressure or pushing force of the rollers against the wall is in direct proportion to the speed of rotation of the shaft 25. This construction presents the advantages that the rollers may be made nearly fully as long as the depth of the container and hardly any space is lost vertically by being occupied by machine elements beyond the length of the rollers. The absence of springs is noteworthy and makes for simplicity and durability of the construction and the manufacture and assembling of the several parts is simple. The rollers 24 should be true cylinders adapted to effect perfect contact longitudinally with the wall 11 of the container so that the action of said rollers will be uniform throughout the operation.

Referring now to Figs. 3 and 4 the parts similar to those already described are numbered correspondingly. In this case the developing rollers 24 are supported on hardened steel pivots 43 rotating in the hardened steel bearing brackets 45. These latter are secured to the lower arms 46 fixed to the shaft 25. The latter also carries upper arms 47 and the arms 46 and 47 are provided with bifurcated ends 48 in which slide the lateral roller bearings or pressure blocks 49 which are urged against the rollers by springs 50 which thus serve to maintain the rollers in frictional contact with the wall of the container.

This construction is somewhat simpler than the one illustrated in Figs. 1 and 2, but involves the use of springs as shown. Also in this instance the rollers may be made nearly as long as the container is deep.

Referring to Fig. 5 the operating shaft 25 carries a single arm comprising the hub 50, upper and lower webs 51, 51 and the bifurcated outer end portion 52 in which is located the pressure box 53 held against the roller 24 by springs 54. 55 is a ledge which supports the box 53 as will be understood. In this case the rollers 24 are rotated on ball bearings 56 which run in a track or groove 57 in the container, or on the bottom thereof. Sufficient play is of course allowed in the ball bearing to allow the springs 54 to press the rollers against the wall 11. This construction may be more expensive than those already described, but it permits of the utmost utilization of the vertical space for the rollers 24 which are made just short enough to clear the top and bottom of the container.

The vertical containers or kettles above described combine the advantages of relatively large capacity while occupying a relatively small floor space. The action of the vertical rollers is also more perfect and uniform due to the constant pressure and there is no lost motion.

While I have disclosed my invention in its preferred form, it will be understood that nothing herein is intended as an express limitation but that changes and alterations may be made within the scope of the appended claims without departing from the principle of the invention.

I claim—

1. A machine of the character described comprising a cylindrical container having an imperforate vertical side wall, a centrally disposed shaft therein, a plurality of rollers, said rollers being of a length substantially equal to the height of the said side wall, means for supporting the said rollers adjacent the wall of the said container in diametrically opposite relationship, said means comprising an upper and a lower arm secured to the said shaft, upper and lower levers pivoted on the said arms, the said levers having bifurcated ends, brackets secured to said upper levers, means for suspending the said rollers from the said brackets with the bodies of said rollers resting within the said bifurcated ends of the levers, which latter and the said arms form obtuse angles with respect to each other and means for rotating said shaft in the direction opposite to that indicated by the apex of the said obtuse angles.

2. A machine of the character described comprising a cylindrical container having an imperforate vertical side wall, a centrally disposed shaft therein, a plurality of rollers, said rollers being of a length substantially equal to the height of the said side wall, means for supporting said rollers adjacent the wall of the said container and in diametrically opposite relationship, said means comprising arms secured to said shaft, levers pivoted on said arms and forming obtuse angles therewith, said levers having bifurcated ends adapted to receive the said rollers, the cylindrical surfaces of which rest within and against said bifurcated ends, means for pivotally suspending said rollers from the said levers and means for rotating said shaft in the direction opposite to that indicated by the apex of the said obtuse angles.

Signed this 21st day of May A. D. 1919.

OSCAR M. STOUT.